July 27, 1965  J. W. HICKS, JR  3,196,738
FIBER OPTICAL COMPONENTS
Filed Aug. 30, 1960  2 Sheets-Sheet 1

INVENTOR
JOHN W. HICKS, JR.
BY
Louis L. Gagnon
ATTORNEY

July 27, 1965  J. W. HICKS, JR  3,196,738
FIBER OPTICAL COMPONENTS
Filed Aug. 30, 1960  2 Sheets-Sheet 2

INVENTOR
JOHN W. HICKS, JR.
BY
*Louis L. Gagnon*
ATTORNEY

United States Patent Office 3,196,738
Patented July 27, 1965

3,196,738
FIBER OPTICAL COMPONENTS
John W. Hicks, Jr., Fiskdale, Mass., assignor to American Optical Company, Southbridge, Mass., a voluntary association of Massachusetts
Filed Aug. 30, 1960, Ser. No. 52,886
5 Claims. (Cl. 88—1)

This invention relates to improvements in light-conducting fibers and optical devices formed of said fibers. More particularly, the invention relates to improved light-conducting fiber optical devices and components manufactured by an assembling, fusing and drawing technique. Each fiber optical component or device will comprise a very large number of very small similar light-conducting fibrous elements or filaments positioned in part or entirely in interlocked side-by-side grouped relation to each other in such a manner that each individual element or filament thereof will function independently and efficiently in conducting light from one end thereof to the other, and collectively all of the filaments will function to provide an image transfer device or component having good resolution and contrast.

It has been known for a long time that many thin long transparent filaments of glass can be bunched together and used to transmit light and even transmit an optical image from one location to another, but this has only been accomplished with a limited degree of success. Prior devices of such character have been extremely difficult to fabricate particularly when the number of light-conducting fibers or filaments for forming an image transfer device is increased to give high degrees of image resolution, the problem of assembly becomes increasingly more difficult, because it is necessary to have each fiber of the bundle being formed positioned in the bundle in an orderly array since the reproduced image at the exit end thereof depends directly upon the arrangement of the individual fibers at the entrance end of the bundle. For example, if a transfer device of four inches in cross-sectional area is to be produced and if as many as 250,000 filaments per square inch are to be employed, the problem of assembly alone has been heretofore practically insurmountable. The method and apparatus of the present invention has greatly reduced the difficulties of forming optical image transfer devices of the above-mentioned character.

Further, in forming such devices and to prevent loss of resolution and definition of image due to light leakage from one filament into an adjacent filament, and to insure a high degree of transmission of light through each fiber or filament by internal reflection, each of said fibers or filaments is preferably formed with a core of light conducting high index material, preferably glass, completely coated throughout its length with a very thin layer of transparent material of a lower refractive index, preferably glass. Each coating is applied in such a way that good optical contact with the smooth outer surface of its supporting core is accomplished before the many filaments for making up a bundle are actually bunched together. Thus, in the finished assembled device or component, each core is optically insulated from the next and the bunched ends of adjacent filaments provide a cross-sectional end area of very high light-accepting efficiency.

The present invention provides not only a method by which optical image transfer devices of the above improved type may be made but also image transfer devices and components of a fused-together type such as would result from practice of the invention. Novel apparatus is also disclosed.

It is, accordingly, an object of the present invention to provide novel optical devices and components comprising a small or very small elongated light-conducting element or a number of such elements positioned in fixed transversely interlocked side-by-side relation to each other.

It is also an object of the present invention to provide in such optical image transfer devices and components suitable means for ensuring transmission of a very high degree of the light which enters the individual elements or filaments at one end thereof through the entire lengths of the elements without appreciable loss of light or absorption.

A further object of the invention is to provide a plurality of rods each embodying a core of glass of a relatively high index of refraction having a relatively thin cladding of glass of a lower index of refraction thereon, forming said rods to a cross-sectional shape similar to that of a butterfly shape, placing and supporting said rods in relatively intimate bundled relation whereby said butterfly cross-sectional shapes will, during said bundling, automatically cause said rods to assume an intimate aligned interlocked relation with each other and thereafter heating and drawing said rods to a fused unitary strand of relatively small fibers with substantially no altering of the cross-sectional configurations of the fibers in the resultant fused strand.

Another object of the invention is to repeatedly rebundle, draw and fuse a plurality of drawn strands of fibers until an optical element of the desired size comprising a plurality of small fibers of said butterfly cross-sectional shapes is produced, with the said relatively thin glass claddings, functioning to retain said high index cores of said fibers in insulated spaced relation with each other.

It is an additional object of the invention to provide optical devices and components having the above characteristics and which are either of a rigid or semi-flexible, or even flexible nature, as well as a method of producing same.

Other objects and advantages of the invention will become apparent from the detailed description which follows when taken in conjunction with the accompanying drawings in which.

Figure 1:
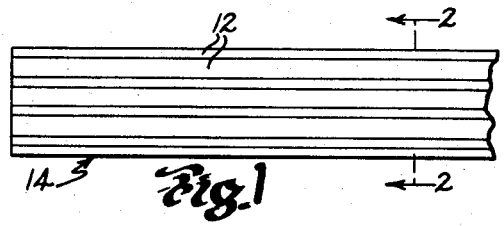
FIG. 1 is an elevational view of an assembly of parts formed in accordance with the method of the present invention.

In FIG. 1 is shown a plurality of thin elongated rods 12 of glass positioned together in side-by-side parallel contacting relation to each other so as to form a bunch or bundle 14. This bundle may be, as clearly indicated in the enlarged cross-sectional view of FIG. 2, formed of rods of like size and cross-sectional shape, and generally but not necessarily the bundle will be of a thickness which is approximately equal to the width thereof. These rods are for convenience in carrying out of the method preferably all of approximately the same length.

Figure 2:
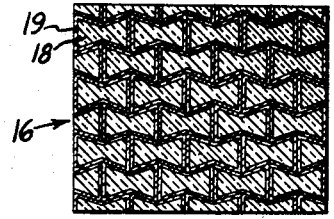
FIG. 2 is a cross-sectional view taken substantially upon section-lines 2—2 of FIG. 1 and showing parts considerably enlarged.
Figure 7:
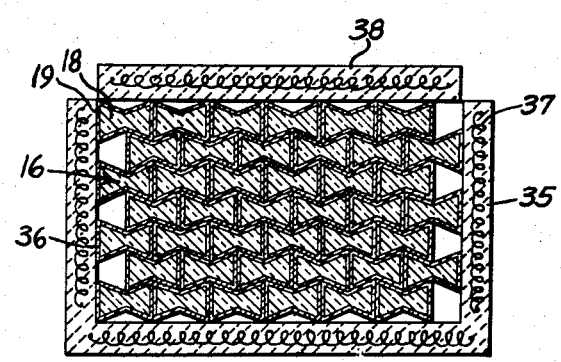
FIG. 7 is a vertical sectional view of apparatus for use in carrying out certain steps of said method and showing parts enlarged to a different scale.

As will be clear from inspection of FIG. 2, as well as FIG. 7, individual rods of the bundle are of like size and cross-sectional shape, and in the present instance are of a so-called butterfly shape as indicated at 16, whereby the said rods, when assembled, will interlock with each other in directions transversely of the longitudinal axes of the rods.

Each rod 12 to be employed in the forming of the bundle 14 is preferably formed of a glass core 18 of good optical or ophthalmic properties and of a fairly high refractive index having a coating 19 of glass of a lower index of refraction thereon so that a high degree of internal reflection will be obtained. This outer low index layer 19 may be, for instance, integrally secured in place upon the core 18 by momentarily dipping each rod into a molten batch of glass of lower refractive index. Any other suitable method of applying a thin uniform continuous low index glass layer to the core may be employed. It is important, however, that such an outer layer or coating of low refractive index be not only relatively thin but also entirely continuous; the thinnest being so that a minimum of the total end area of the resulting fused bundle of rods will be utilized by the combined areas of all outer coatings or layers, and the continuity requirement being so that high internal reflection of light at all places along the length of each core will take place at the interface between the low index coating and the high index core later when the finished device, resulting therefrom, is put into service.

Figure 3:
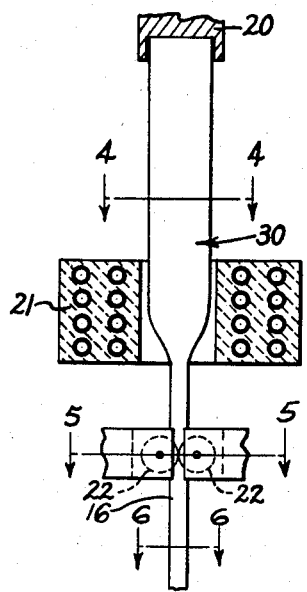
FIG. 3 is a sectional view of different apparatus for use in performing certain steps of said method.
Figure 4:
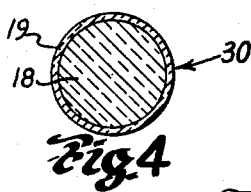
FIG. 4 is an enlarged cross-sectional view taken as on line 4—4 of FIG. 3 looking in the direction indicated by the arrows.

To obtain the butterfly cross-sectional shape 16, a coated glass rod, as shown in FIG. 3 normally having a circular cross-sectional shape, may be clamped or secured in a suitable holder 20 and hung in a vertical position. The rod may then be lowered through a furnace or suitable heating unit 21 by slowly lowering the holder 20 by suitable means not shown. The rod is thereby slowly heated to its softening temperature and maintained at this temperature to permit the rod to elongate under its own weight and be drawn out by a pair of rollers 22 through which the heated rod may be directed. The rollers 22 are mounted on a pair of drive shafts 23 and 24 journaled respectively in blocks 25 and 26 and are turned in opposite directions by drive means of known construction 27.

Figure 5:
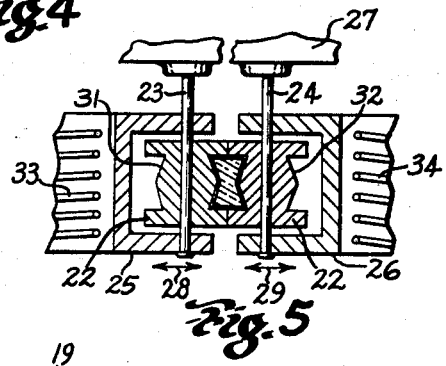
FIG. 5 is an enlarged sectional view taken substantially as on line 5—5 of FIG. 3.
Figure 6:
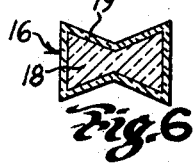
FIG. 6 is an enlarged sectional view taken as on line 6—6 of FIG. 3 and looking in the direction indicated by the arrows.

As clearly indicated by double-headed arrows 28 and 29 in FIG. 5, these blocks 23 and 24 are shiftable toward and away from each other by suitable means (not shown) so that the initial rod will be held in firm contact with the rollers. The rollers 22 have their peripheral surfaces 31 and 32 recessed and these recessed surfaces are carefully controlled in accordance with the size and shape of the rod to be formed thereby. For example, in the instance wherein the coated rod is to be formed to a butterfly cross-sectional shape as shown in FIG. 6, the surface shapes 31 and 32 of the two rollers 22 will be such as to provide a space therebetween which is substantially of said butterfly shape. The rollers are adapted to be heated by suitable heating coils 33 and 34 to maintain them at a suitable temperature for the shaping of the rod as shown in FIG. 5 and to prevent undesired chilling of said rod during said shaping.

By following the above procedure, a plurality of rods of smaller diameter than the initial rod 30, and each having a butterfly cross-sectional shape, may be formed by cutting the drawn rod 16 into sections and grouping them together in a suitably shaped recess in a ceramic or carbonaceous support, or all metal or metal clad support, such as generally indicated by the support 35 in FIG. 7. The support 35 has an elongated recess 36 of proper size in which the rods are tightly packed and heated to bring the rods to a superficial fusing temperature by means of suitable heating coils, or the like 37.

Figure 8:
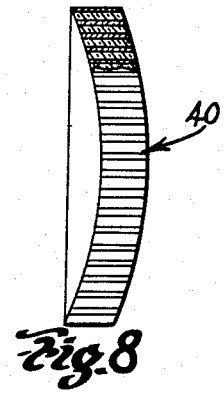
FIG. 8 is a sectional view of a form of optical image transfer device embodying the present invention.

It is to be understood that the rods, as shown in FIG. 7, are initially placed in intimately packed relation with each other and that pressure may be imparted thereto under the action of gravity by means of a weighted cover, or the like 38, placed upon the top of said packed rods. The upper end of the superficially fused bundle of rods may then be placed in a holder similar to the holder 20 so that they will be substantially vertically suspended with the lower end of the bundle extending through a heating unit such as the unit 21, whereby the bundle of packed superficially fused rods may then be heated to a softening and drawing temperature in a manner similar to that described in connection with FIG. 3 to reduce the bundled rods down to a smaller size for rebundling or to a size wherein the rods will be reduced to the ultimate fiber size desired. In the latter instance, suitable pressure rollers similar to the rollers 22 may be used to exert a slight side pressure on the drawn portion of the bundle of rods and, in which instance, the recessed surfaces of the rollers will have a shape substantially that desired of the ultimate shape of the end optical product to be formed. It is to be understood that the pressure is only slight and not enough to cause the butterfly cross-sectional shapes of the resultant drawn fibers to be distorted or deformed, keeping in mind that the fibers will retain the initial geometrical cross-sectional configurations of the rods, and the related proportions of the core and claddings will also be retained. This step of drawing and rebundling may be repeated until the ultimate desired size of the optical element is obtained, for example, a face plate for an electronic tube or the like such as shown at 40 in FIG. 8.

It is further pointed out that fusion of the low index coatings on the individual fibers takes place simultaneous to the drawing of said bundle of fibers and because of the butterfly cross-sectional shapes of said fibers, a compact air-tight assembly is obtained.

In following the teachings of the present invention, it has been found possible to coat the outer surface of individual 3/16" high index rods of glass (having a refractive index in the neighborhood of approximately 1.61 to 1.75) with an outer thin layer of low index glass (having a refractive index in the neighborhood of approximately 1.52 to 1.54), to shape, assemble and fuse a plurality of these individually coated rods together to form a unitary assembly or cluster. (Such an assembly might vary in actual commercial use of the invention in cross-sectional size from approximately 3/4 of an inch to 4 or 6 inches in diameter.) Thereafter the free end of this fused assembly was heated to a softening temperature and drawn out as a continuous multifibered strand having substantially the same cross-sectional shape but of a greatly reduced size; reduced from approximately 3/4 of an inch down to approximately 0.10 of an inch. If it had been desired, this strand could have been reduced even more during this initial drawing operation. Thus, even though the cross-sectional size of the fused bundle was reduced as much as 25 to 1 in a single drawing step, nevertheless, its geometric cross-sectional configuration was substantially unchanged.

Such a multifibered strand is relatively stiff. Accordingly, from the standpoint of both convenience and efficiency during production, the strand being continuously drawn out may be periodically severed into equal lengths and grouped or stacked together to form a second bundle. A bundle of strands of this size might find utility in certain places wherein only a moderate degree of image resolution is required since the several light-conducting fibers thereof are of fairly small cross-sectional size. Furthermore, since strands of this size may be flexed small amounts, it may be that at times, one may wish to take advantage of this flexibility; such as in aligning the bunched ends of such a bundle of strands with elements of an associated optical apparatus. In other instances, a group of these multifibered strands may be slowly heated to a temperature wherein the strands will soften enough to allow all of the strands to be simultaneously shaped or curved intermediate their ends.

In cases wherein a higher degree of resolution than that mentioned above as desired or required, in optical images being transferred by the improved device or component, the additional procedure may be followed to produce a finished structure which will have a very large number of optically insulated filaments of very small cross-sectional size, each filament thereof providing a separate and independent path for a portion of the light of the image being transferred thereby.

A sizable number of such multifibered strands may be grouped together to form a bundle and clamped together, or positioned in a suitably shaped recess in a ceramic support, or the like, and slowly heated to fuse these strands together. Thereafter, this bundle will be heated slowly at one end thereof and a thread composed of many fine optically isolated filaments withdrawn therefrom; the number of filaments, of course, corresponding to the number of cores used initially. The cross-sectional size of such a thread can be controlled during drawing by control of the amount of heat being applied to the end portion of the fused bundle of strands and by the rate at which the thread is withdrawn.

Of real interest, however, is the fact that the resulting thread, nevertheless, will still retain very closely the geometric pattern originally provided the bundle and each filament will have a core of high index material optically separated or optically isolated from adjacent filaments by a surrounding layer or coating of low index transparent material.

Many lengths of these multifilament threads are then grouped or bunched together to build up an assembly having the cross-sectional end area desired. The threads of the assembly may be secured together at one or both ends, or even throughout a preselected portion thereof, or even throughout the entire length of the assembly by suitable binding means, or by cement or even by fusing the threads thereof together.

By such a procedure, an optical device or component having an appreciable area may be built up and this device or component will have a much higher degree of image resolution. It is also possible to utilize such an assembly of multifilament threads which have been secured together throughout an extended length thereof by cutting by known means this secured-together length of threads into a number of shorter sections for finishing into optical components. Generally, but not always, the end surface or surfaces of such an optical component would be optically finished in known manner as by grinding, or polishing or both so as to readily transmit light therethrough. If an end of the component, however, is to be immersed, for example, in a liquid of like refractive index, grinding and polishing on the end surface would not be required.

It may be desirable to further reduce the cross-sectional size of the multifilament threads just described, as for example, wherein even greater image resolution provided by the finished optical device is desired. This can be obtained by repeating the assembling, fusing, drawing and finishing steps mentioned above. It has been found, for example, that starting with a fused bundle of 3/16 inch coated rods, the bundle can be reduced to a thread of as little as 0.001 of an inch or even smaller. Microscopic examination of cross sections of such multifilament threads produced by this method, nevertheless, reveals that each individual filament thereof retains its original shape. Such a thread is quite flexible. Thus, if a large number of these threads, each having such a multifilament construction, are bundled together at their opposite ends, a very flexible image transfer device can be produced.

At places wherein the words "image resolution" have been used in various parts of the foregoing specification with reference to optical devices and optical components made in accordance with the present invention, it is intended that these words will be interpreted in accordance with the physical characteristics and requirements of the optical device or associated means with which the improved image transfer device is to be used. For example, if the improved device is to form the face of a television tube which does not enlarge, it may look somewhat like the component 40 shown in FIG. 8, although the cross-sectional size of the individual filaments or light conducting elements thereof may be very much different from that required for a similarly appearing device being used between lens elements of an optical system.

It is to be understood that when a low index glass is used as described herein as the light-reflecting coating for the glass forming the cores or centers of the rods or filaments, any two high and low index glasses chosen to work together will be selected so that certain other desirable physical characteristics are also provided. For example, preferably, both glasses should be of good durability, should be transparent and colorless, and should have nearly the same coefficient of expansion (at least within the range from annealing to room temperatures). And, of course, both glasses should have nearly the same melting characteristics or the low index glass forming the coating should have a slightly lower melting point.

Thus, it will be appreciated that a total reduction in size in the individual fibers or filaments of each fused-together multiple element strand of the optical devices or components of the character described of as much as 500 to 1, or even more, can be produced, while still having each individual element or filament thereof optically separated from adjacent elements or filaments and thus each will retain its selective light-conducting properties and high light-conducting efficiency.

Figure 9:
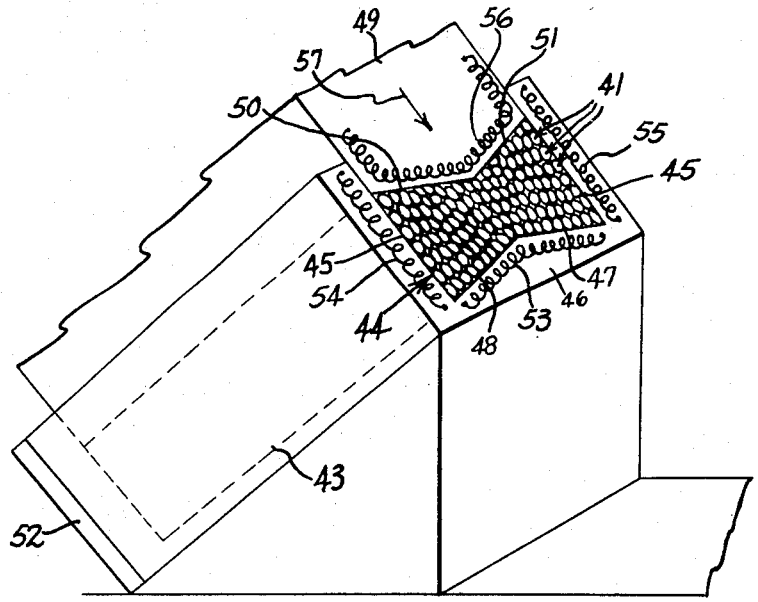
FIG. 9 is a perspective view of apparatus embodied in a modified form of the invention.

In FIG. 9, there is illustrated apparatus for use in producing a modified form of the invention wherein a plurality of rod-like members 41 of circular cross-sectional shape each embodying a core 41' of transparent material, preferably glass, having a relatively high index of refraction and each having a cladding 42 of transparent material, preferably glass, of a relatively low index of refraction thereon are packed within a support 43 of material similar to that defined in connection with the support 35 and having an elongated recess or cavity 44 with substantially parallel side walls 45 and a base 46 with angularly disposed portions 47 and 48. The support 43 has, extending within the open side of the recess or cavity 44, a plunger 49 having an end portion comprising angularly disposed surfaces 50 and 51 simulating the angular portions 47 and 48 of the cavity 46. The angularly disposed portions 50 and 51, and 47 and 48 in combination with the parallel side walls 45 define a cavity having a substantially butterfly shape, as shown in FIG. 9. The support is provided with a closed-end base 52 whereby the circularly cross-sectioned rods 41 may be relatively intimately packed into the cavity and, by reason of the fact that the support is disposed at an angle they will assume, under the action of gravity, a relatively compact relation with each other. The support 43 and plunger 49 are provided with heating coils 53, 54, 55 and 56 throughout the length thereof whereby the rods may be heated to a controlled temperature sufficient to cause the engaging surface portions thereof to fuse simultaneously with the exertion of a pressure thereon by moving the plunger 49 inwardly a controlled amount in the direction indicated by the arrow 57 through the provision of suitable means not shown. This causes a unitary incipiently fused strand of a multiplicity of rods 41 to be formed and which may thereafter be suspended by placing same in a holder simulating the holder 20 with the lower end thereof extending inwardly of a heating unit simulating the heating unit 21. The strand is adapted to be heated by said heating unit to a softened state whereby it may be drawn down to a reduced dimension. The strand, during said drawing, will retain the butterfly cross-sectional shape to which it was initially formed. This drawing down to a reduced size can be accomplished by the action of gravity or by a method similar to that previously described in connection with the drawing down of a strand 16.

Figure 10:
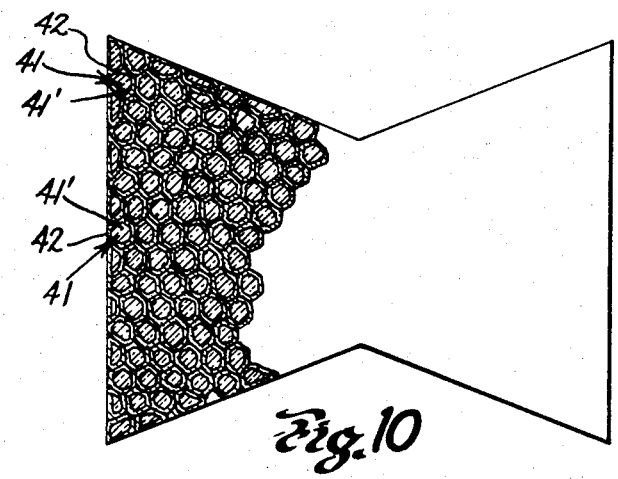
FIG. 10 is a sectional view of a multi-fibered rod resulting from the use of the device illustrated in FIG. 9.

It is to be noted that, as shown in FIG. 10, the superficially or incipiently fused coated rods 41 will be altered as to their cross-sectional shapes during the compressing and fusing thereof in the device illustrated in FIG. 9 while the resultant strand will be shaped to the desired-cross-sectional butterfly shape. However, the said coated rods will not of necessity be air-sealed with each other throughout the engaging side surfaces thereof. It is pointed out that during the subsequent drawing of the strands of multiple rods down to a reduced cross-sectional shape, as defined above, the said rods will be fused into an air-tight composite structure with the coatings of the respective rods being in tightly fused and sealed relation with each other. The resultant strand, however, by reason of the fact that rollers simulating the rollers 22 having the shaped cavities 31 and 32 are used during said second or subsequent drawings, will have the butterfly cross-sectional shape whereby the resultant strand may then be cut into a plurality of sections of substantially equal lengths, rebundled, as shown in FIG. 7, heated and superficially or incipiently fused. The resultant composite strand is then supported by a holder similar to the holder 20 and heated and drawn down to the ultimate shape of the light-transmitting device desired.

It is to be understood that the coated rods are ultimately drawn down to the final fiber size desired as results from the previously described process and that the fibers will retain the cross-sectional shapes to which they were initially formed and that the strands of composite fibers, by reason of their butterfly cross-sectional shapes, will automatically align and fuse into an intimate air seal composite optical component. The problem here is that of providing a plurality of strands each having a butterfly cross-sectional shape and each embodying a plurality of coated rods which may be bundled into compact relation with each other with the butterfly cross-sectional shapes causing the strands to assume a proper aligned intimate relation with each other and the fibers within said strands, which result from drawing the strands and inner coated rods down to a smaller cross-sectional size, to all retain an aligned relation and same geometrical pattern at each of the ends thereof.

While certain apparatus and steps of the method have been shown and described as a means of obtaining the end results desired, it is to be understood that other known apparatus and steps of the method may be employed in carrying out the invention. The main feature of the invention being that of shaping the fibers to the so-called butterfly cross-sectional shapes to cause said fibers to more positively fit in interlocked relation with each other and to retain said relation during the carrying out of the various steps of the method whereby the opposite ends of the fibers in the end product will have the same geometrical pattern.

Having described my invention, I claim:

1. A light-transmitting member comprising a relatively long and slender strand of light-conducting material having a core of relatively high index of refraction and an integral relatively thin coating of material having a relatively low index of refraction, said strand having the cross-sectional configuration of a re-entering polygon formed by a pair of spaced oppositely disposed substantially plane parallel sides of said strand joined respectively by a pair of re-entrant V-shaped other sides disposed one opposite to the other with lines of respective apices thereof running adjacently in a plane located approximately centrally between and mutually parallel with said first mentioned sides.

2. A light-transmitting fiber comprising a plurality of light-conducting strands each embodying a core of light-conducting material having a relatively high index of refraction surrounded by an integral relatively thin substantially uniform coating of material having a lower index of refraction than said core, said strands being fused together in interfitting side-by-side relation and arranged to compositely provide said fiber with cross-sectional configuration of a butterfly shaped re-entering polygon, said fiber having a pair of oppositely disposed substantially plane parallel sides joined respectively by a pair of re-entrant V-shaped sides disposed one opposite to the other with lines of respective apices thereof running adjacently in a plane located approximately centrally between and mutually parallel with said first mentioned sides.

3. An optical component of the character described comprising a long and slender single strand of light-conducting material having a relatively high refractive index coated with a material of relatively low refractive index, said strand being uniformly cross-sectionally contoured to the configuration of a butterfly shaped re-entering polygon having a pair of oppositely disposed substantially plane parallel sides joined by a pair of concave V-shaped sides disposed opposite one another.

4. A light-transmitting device comprising a bundle of a plurality of light-conducting fibers each having a core of material of relatively high refractive index coated with a material of relatively low refractive index, said fibers having the cross-sectional configuration of a butterfly shaped re-entering polygon formed by a pair of substantially plane parallel oppositely disposed sides respectively joined by a pair of re-entrant V-shaped sides disposed one opposite to the other with lines of their respective apices running adjacently in a plane located approximately centrally between and mutually parallel with said first mentioned sides, said members being assembled in interfitted side-by-side relation with at least one of said plane parallel sides of each member adjoining a similar side of another member and with corresponding edges of said adjoining sides together being fitted centrally into a V-shaped side of an adjoining fiber to interlock said assembled fibers against displacement of one relative to another in at least one direction across said bundle.

5. A light-transmitting device comprising a composite assembly of a plurality of light-conducting fibers each having a core of material of relatively high refractive index coated with a material of relatively low refractive index, said fibers having a cross-sectional configuration simulating a butterfly shape formed by a pair of spaced substantially plane parallel opposite side respectively joined by a pair of re-entrant V-shaped sides disposed one opposite the other with lines of respective apices thereof running adjacently in a plane located approximately centrally between and mutually parallel with said plane parallel sides, said fibers being so arranged in the assembly that at least one of the inwardly directed V-shaped sides of each interlocks with portions of corresponding sides of at least two other such fibers, said fibers being fused to adjacent fibers to form a unitary structure.

References Cited by the Examiner

UNITED STATES PATENTS

| | | | |
|---|---|---|---|
| 2,652,660 | 9/53 | Kurz | 49—79 |
| 2,825,260 | 3/58 | O'Brien | 88—1 |
| 2,992,516 | 7/61 | Norton | 49—79 |
| 3,041,228 | 6/62 | MacLeod. | |

JEWELL H. PEDERSEN, *Primary Examiner.*

EMIL G. ANDERSON, *Examiner.*